United States Patent [19]

Willy

[11] 3,965,310

[45] June 22, 1976

[54] APPARATUS FOR LIMITING ACCESS TO TELEPHONE DIALING AREA

[76] Inventor: Alan Willy, 1734 L Ave., National City, Calif. 92050

[22] Filed: Sept. 23, 1974

[21] Appl. No.: 508,426

[52] U.S. Cl. .............................................. 179/189 D
[51] Int. Cl.² ......................................... H04M 1/66
[58] Field of Search .................... 179/189 R, 189 D

[56] References Cited
UNITED STATES PATENTS

| 1,620,628 | 3/1927 | Beth | 179/189 D |
| 3,624,317 | 11/1971 | Buckingham et al. | 179/189 R |
| 3,866,000 | 2/1975 | Gillis | 179/189 D |

Primary Examiner—Thomas W. Brown
Attorney, Agent, or Firm—Robert E. Wagner; Robert E. Browne

[57] ABSTRACT

An apparatus for limiting access to the dialing area of a telephone consists of a frame positioned around the dialing area and is firmly clamped in place. A shield is attached to one side of the frame by means of hinges and may be secured to the opposite side to limit access to the dialing area by means of a lock.

7 Claims, 4 Drawing Figures

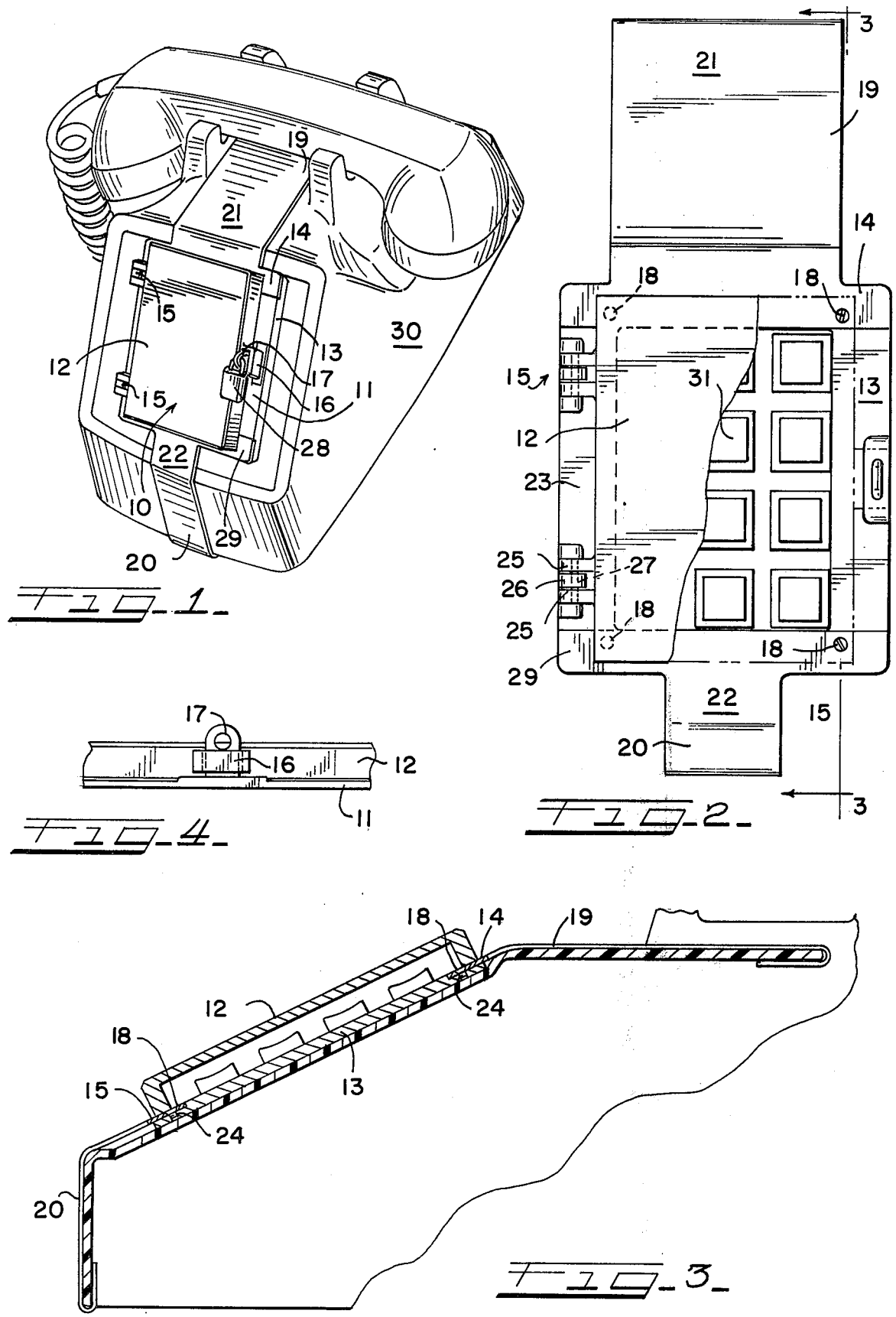

APPARATUS FOR LIMITING ACCESS TO TELEPHONE DIALING AREA

BACKGROUND OF THE INVENTION

This invention relates to a telephone dial shielding device for selectively permitting or preventing access to the dialing area of a telephone face. Telephone locks have been in common use since the advent of the widespread use of the telephone and, up until recently, have been of two general types. The first and more common type is a means designed to obstruct the rotation of the dial, and thus to prevent dialing. The second type of telephone lock in use up until the present time is a clamp on the handset designed to prohibit its use. There might also be said to be a third general class of telephone locks — that of a combination of the above two already described.

All of these common types of telephone locks have their disadvantages. The lock using the method of preventing rotation of the telephone dial is easy to circumvent by removal of the dial finger stop. Furthermore, the nature of its size and the necessity of entirely removing the device from the telephone to place an outgoing call renders this lock easy to lose or misplace. This type of lock is also restricted solely to the use of a cam-type lock. The second type of telephone lock, i.e., the handset clamp, is bulky, difficult to install, undesirably restricts incoming calls and is generally not practical. Obviously, those locks combining the features of both suffer the disadvantages of both.

The need for a practical telephone lock suitable for use with both dial-type and pushbutton-type telephone dial faces is an indisputable fact of modern day business life. It is therefore, a principal object of this invention to provide a telephone dial shielding device for selectively permitting or preventing access to the dialing area of a telephone face.

Another object of the present invention is to provide a shielding device for a telephone face which, when unlocked, does not need to be detached from the telephone body.

Another object of the present invention is to provide a telephone shielding device which may be locked with any locking means available at the time, e.g., combination lock, key lock or other like means.

Still another object of the present invention is to provide a locking device which may be used interchangeably on either a rotary dial or pushbutton telephone base and is easily installed on both.

The above objects are accomplished with the telephone shielding device which is the subject of this invention. Accordingly, to the general features of the invention, a frame is adapted to be firmly clamped in place upon the telephone body. Attached to this frame by means of hinges on one side of the frame is a shield which, in the preferred embodiment of this invention, has, on the side opposite the hinges, a slotted projection constructed to fit over a hasp secured to the frame. When the slotted projection is placed over the hasp, a lock may be positioned through the hasp, thereby securing the dial face from use. In this manner, outgoing calls may not be made, although incoming calls may still be answered.

Other advantages of the present invention will be readily apparent from the following detailed description of the preferred embodiment thereof, taken in view of the accompanying drawings in which:

DESCRIPTION OF THE DRAWINGS

FIG. 1 is a front elevational view of a telephone employing a preferred embodiment of the locking device of the present invention;

FIG. 2 is a top plan view of the present invention showing a cut-away view of the shield exposing the pushbutton dialing array beneath;

FIG. 3 shows a side cross-sectional view of the present invention further illustrating the relationship of the pushbutton dialing array to the shield and also the manner in which the frame is attached to the telephone body in the preferred embodiment of the invention; and, FIG. 4 is a right-side view of the present invention illustrating the manner in which the slotted projection of the shield is positioned in respect to the hasp of the frame when in the closed position.

DESCRIPTION OF THE INVENTION

Referring to the drawings and to FIG. 1 in particular, the telephone shielding device 10 is comprised of a frame 11 which has horizontal members 14 and 29, and vertical members 13 and 23 positioned around the perimeter of the dialing face 31. The horizontal members 14 and 29 are opposing members which, along with the arms 19 and 20, form bands 21 and 22 of unitary construction to extend around the base of the telephone, thereby securing the frame to the telephone body 30. This method of attachment in the preferred embodiment of the present invention is shown more particularly to FIG. 4, where it can be seen that the upper band 21 and the lower band arm 22 have hook-shaped extensions which clamp to the extremities of the exterior of the telephone body. On the vertical frame member 23, a shield 12 is attached by means of hinges 15. These hinges 15 consist of two sets of two ears 25, integrally attached to the shield 12 and each set of ears connected separately to the frame by means of a pin through the two ears 25, another ear 26 connected integrally to the vertical frame member 23, in between the two ears attached to the shield thus allowing pivotal movement of the shield. The shield may be raised or flush with the telephone dialing area 31 dependent on the thickness of the frame members 13, 23, 14 and 29, it only being necessary that the shield 12 be able to clear the rotary dial or pushbuttons of the phone. Attached to the shield 12 on the side opposite the hinges 15 is a slotted projection 16, which is so positioned in relation to the frame 11 as to fit over the hasp 17, which is secured to the vertical frame member 13. The vertical frame members 13 and 23 and horizontal frame members 14 and 15 are secured to each other by means of fasteners 18, e.g. screws or pegs, placed into corresponding holes 24 in each frame members. In the preferred embodiment of this invention, the holes are formed in each member at the time of manufacturing and positioned at that time so as to create a tension in the apparatus when the vertical frame members 13 and 23 are secured to the horizontal frame members 14 and 29 with the fasteners inserted through aligned holes. This tension serves to hold the frame 11 securely in place around the perimeter of the telephone face.

While it is preferred that the present invention be made of high-impact plastic in order to take advantage of its readily moldable properties, its inexpensive method of manufacture durability, and its combination of light weight with high strength, other materials such as steel or steel alloys, could be used for all or portions of the invention materials similar to that of the telephone body enabling the present invention, with the selection of appropriate colorants in the plastic, to blend in and not detract from the telephone's appearance. These characteristics make the choice of such high-impact plastic very commercially attractive.

To install the preferred embodiment of the invention on the telephone, the upper band 21 and the lower band 22 are hooked over the respective upper and lower portions of the telephone body as shown in FIG. 3. The vertical frame members 13 and 23 are then placed on the telephone dial face and the holes at the ends of the horizontal members of the upper and lower hands and the vertical frame members are aligned by grasping each side separately with the thumb and forefinger and squeezing; one can then secure the alignment thus gained by the use of the screws 18 in the holes 24. With the screws in place, the shield will close into a position such that a lock 28 may be used in conjunction with the hasp on the vertical frame member 13 and the slotted projection on the shield 12 to prevent the opening of the shield and the subsequent use of the telephone. With the shield 12 so closed the screws 18 are concealed by the shield 12 in such a manner that it is not possible to remove the screws 18 and thus disconnect the apparatus from the telephone's body. By such an arrangement locking the shield 12 renders use of the telephone for outgoing calls impossible.

Upon consideration of the foregoing, it will become obvious to those skilled in the art that various modifications may be made without departing from the invention embodied herein. Therefore, only such limitations should be imposed as are indicated by the spirit and scope of the appended claims.

What is claimed is:

1. A telephone dial shielding device for selectively permitting or preventing access to a dialing area of a telephone face, including a frame formed by a plurality of sides extending around the perimeter of the dialing area of the telephone face, a shield pivotally attached to the frame so as to obscure and prevent access to the dialing area of the telephone face when in a closed position, strap means for attaching said frame to the body of the telephone, said strap means for attaching said frame to said telephone body being secured to selective opposing sides of said frame, and means for allowing the securing of the shield to said frame to retain said shield in said closed position adjacent said frame.

2. The combination of claim 1 wherein a locking means locking said frame to said shield is employed to secure the dialing area from unauthorized use.

3. The combination of claim 1 wherein said frame is connected to the strap means for attaching said frame to the telephone body at selected opposing sides of said frame by fastening means inserted through corresponding, aligned openings formed in said frame and said strap means for attaching said frame to the telephone body thereby creating a tension between said opposing attaching means and holding the frame secure on the perimeter of the dialing area of the telephone face.

4. The combination of claim 3 wherein said shield is pivotally attached along one side thereof to said frame in such a way that when in a closed position, said shield obscures and prevents access to the fastening means which secure said frame to said strap means attaching said frame to the telephone body.

5. In a telephone shielding device for selectively permitting or preventing access to a dialing area of a telephone face, the improvement comprising a frame, strap means for attaching said frame snugly to a telephone body, said frame formed by opposing generally horizontal and vertical members extending around the perimeter of the dialing area of the telephone face, a shield attached by hinge means to the frame so as to obscure the dialing area of the telephone and only a portion of said telephone body when said shield is moved to a closed position and means for allowing the securing of said shield to said frame to retain said shield adjacent said frame in said closed position.

6. The combination of claim 5 wherein said frame is connected to the strap means for attaching said frame to the telephone body at selected opposing sides of said frame by fastening means inserted through corresponding, aligned openings formed in said frame and in said strap means, thereby creating a tension between said opposing attaching means and holding the frame secure on the perimeter of the dialing area of the telephone face.

7. The combination of claim 6 wherein said frame is attached to the telephone body and is posed around the perimeter of the dialing area of the telephone, said shield being pivotally attached to said frame in such a way that when in a closed position, said shield obscures and prevents access to the fastening means which secure said frame to said strap means attaching said frame to the telephone body.

* * * * *